Figure 1:
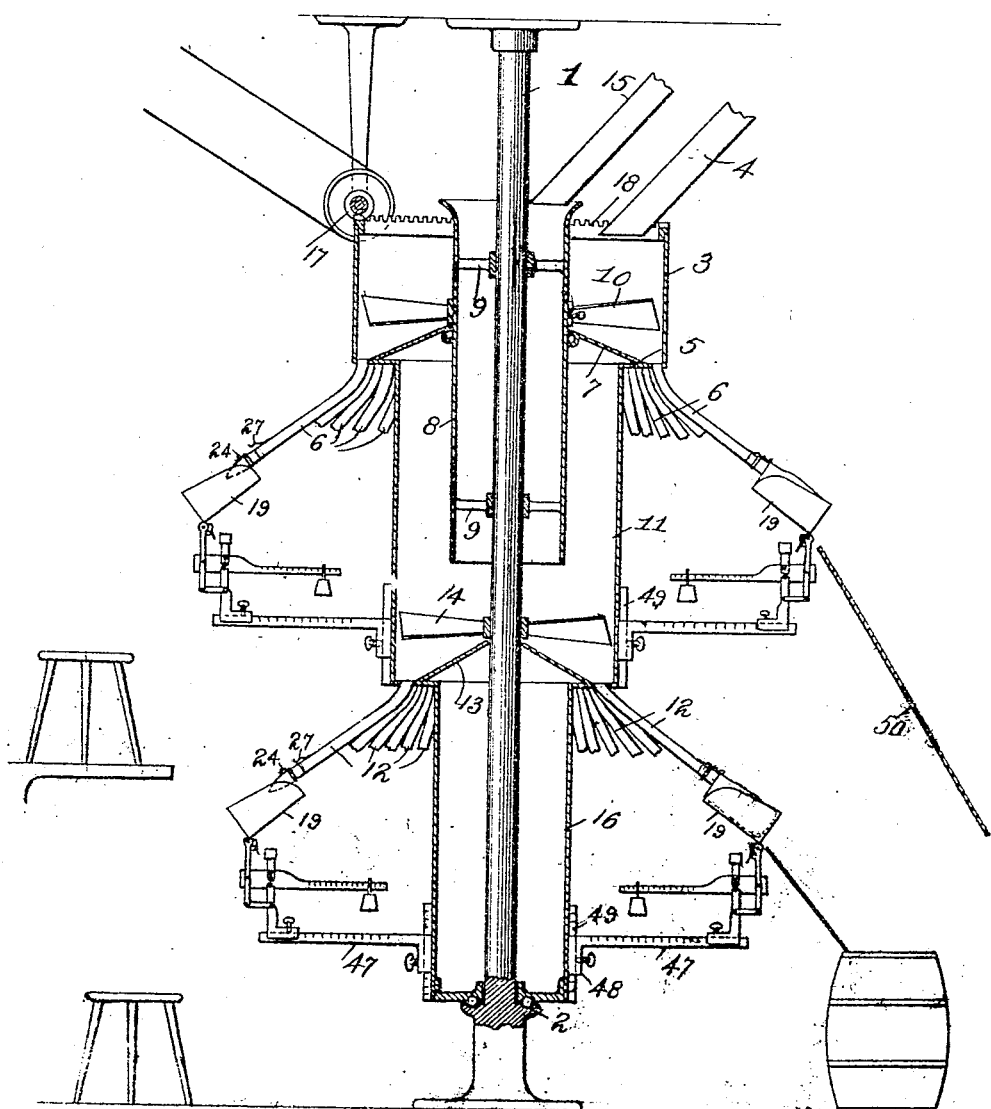

No. 655,322. Patented Aug. 7, 1900.
A. M. BATES.
BAG FILLING MACHINE.
(Application filed July 25, 1898.)
(No Model.) 2 Sheets—Sheet 1.

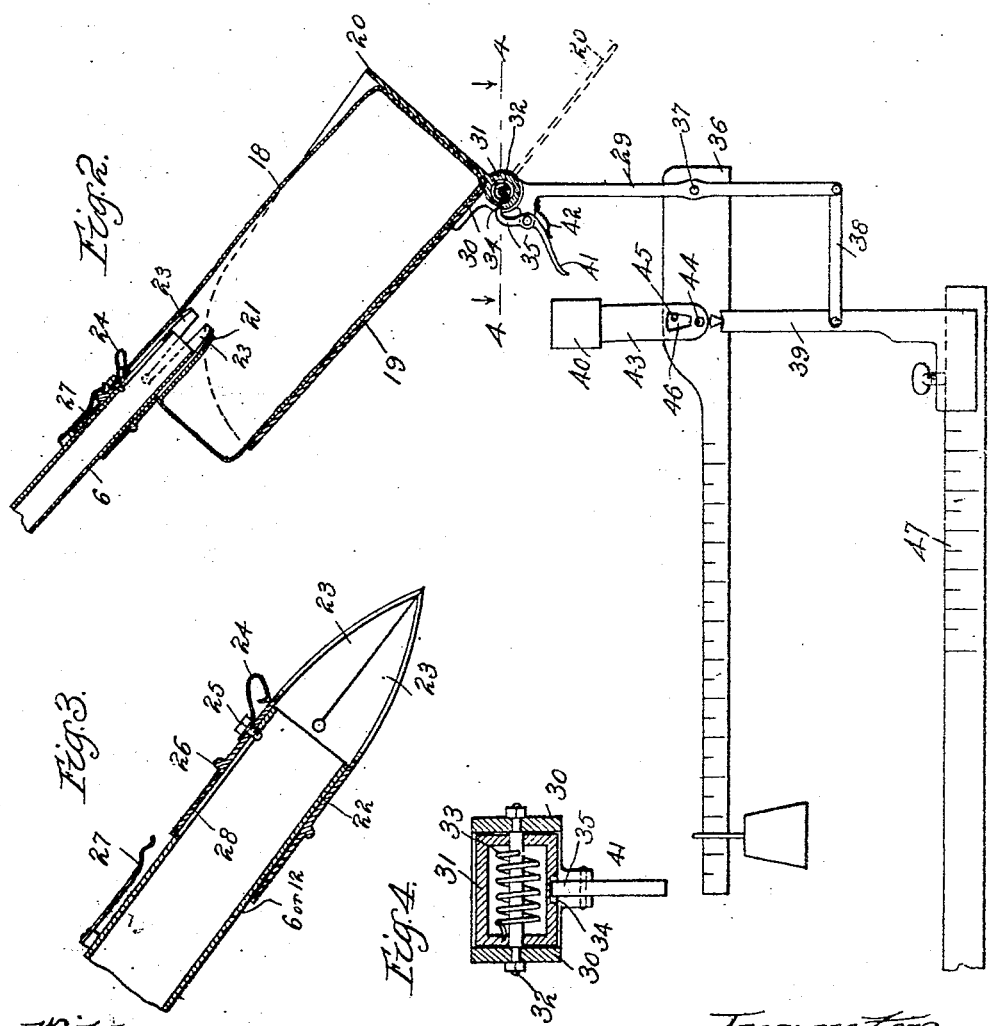

UNITED STATES PATENT OFFICE.

ADELMER M. BATES, OF CHICAGO, ILLINOIS.

BAG-FILLING MACHINE.

SPECIFICATION forming part of Letters Patent No. 655,322, dated August 7, 1900.

Application filed July 25, 1898. Serial No. 686,791. (No model.)

*To all whom it may concern:*

Be it known that I, ADELMER M. BATES, a citizen of the United States, residing at Chicago, in the county of Cook and State of Illinois, have invented certain new and useful Improvements in Bag or Sack Filling Machines, of which the following is a full, clear, and exact specification.

My invention relates to machines for filling bags or sacks, usually with a predetermined quantity of powdered or granular material—such as salt, sugar, coffee, tea, shot, &c.; and my invention has for its primary object to provide simple and efficient means whereby a large number of such bags may be constantly maintained in the course of filling and under the control of the minimum number of operators or attendants in a manner which will permit of the bag being filled and removed without requiring other attention than to merely to put it in place on the machine.

More specifically speaking, the object of my invention is to provide a machine by which a large number of bags may be kept constantly in the course of filling and in which the bag may be filled by simply inserting it over the end of the filling-spout, such act of insertion being sufficient to start the flow of the material and the predetermined weight of the material flowing into the bag being sufficient to automatically shut off the flow and eject the bag from the machine, whereupon the parts automatically become restored to their normal position in readiness for the reception of another bag.

With these ends in view my invention consists in certain features of novelty in the construction, combination, and arrangement of parts by which the said objects and certain other objects hereinafter appearing are attained, all as fully described with reference to the accompanying drawings, and more particularly pointed out in the claims.

In the said drawings, Figure 1 is a vertical sectional view of my improved machine. Fig. 2 is an enlarged detail sectional view of the bag-support and filling-spout, showing the bag and the relation of the other parts with reference to the scale or weighing mechanism. Fig. 3 is an enlarged detail longitudinal sectional view of the end of the filling-spout and the closing cap or valve; and Fig. 4 is an enlarged detail sectional view taken on the line 4 4, Fig. 2.

In carrying out my invention I employ some suitable receptacle or holder for the material with which the bags are to be filled and which holder is provided with a number of filling-spouts leading downwardly therefrom and having means whereby the flow of the material may be controlled. Under each of these spouts is arranged a weighing device which when the predetermined quantity of material has run into the bag the scale or weighing device tips, or weighs down, and thereby ejects the bag and causes the spout to automatically close. When the scale is relieved of the weight of the bag, the parts of the weighing mechanism automatically resume their normal position in readiness for another bag. All of these parts are preferably so mounted as to revolve, so that an operator sitting on one side of the machine may put the bags in place on the scales or bag-holders as they come around and as they recede from him they will receive their supply and drop off before the same spout again reaches him.

Referring now more specifically to the form of the apparatus shown in the drawings, 1 represents a vertical standard or fixed shaft whose upper and lower ends are firmly secured in any suitable manner, and upon this shaft on a suitable bearing 2 is supported all of the revolving mechanism.

In the form of the invention shown in the drawings I have illustrated two banks of filling-spouts; but it will of course be understood that a very efficient machine might be made with but one. In thus constructing the machine of two banks of spouts I preferably employ a receptacle or holder for the material for each bank. The upper one of these holders is of cylindrical form, as shown at 3, and is supplied with the material through a chute 4. The holder 3 is provided with an annular bottom 5, downwardly from which extend the filling-spouts 6, any desired number of which may be employed, but which are preferably so arranged that their upper ends, where they enter the holder or receptacle 3, will be immediately contiguous, while their lower ends are carried off on an incline and widely separated, thus providing for the accommodation of the maximum number of tubes with a receptacle 3 of minimum size.

Extending upwardly on an incline from the inner edge of the spouts 6 is a bottom piece 7, which encourages the material to concentrate over the spouts, and this bottom 7 is fitted around a cylinder or pipe 8, around which it revolves, the pipe 8 being securely fixed to the standard 1 by means of spiders 9 and projects above the end of the chute 4, thus confining the material falling through chute 4 to the upper bank of spouts 6. In order to still further induce a downward trend of the material in the receptacle 1, I fix to the cylinder a propeller 10, of any suitable construction, whose wings project over the spouts 6 and as the receptacle 3 revolves force the material down through the spouts.

Projecting downwardly from the annular bottom 5 is the holder or receptacle 11 for the lower bank of filling-spouts 12, which latter, however, is of considerably smaller diameter than the holder 3. The bottom of the holder 11 is also inclined upwardly to the standard 1, as shown at 13, so as to encourage the material to concentrate over the spouts 12. I also arrange a propeller over the spouts 12 and affix it directly to the shaft or standard 1. The lower holder or receptacle 11 is supplied with material through the cylinder or pipe 8 from a chute 15. The receptacle 11 is provided at its lower end with a downwardly-extending stem or standard 16, which is supported upon the bearing 2, and thus supports the superstructure.

The whole apparatus may be revolved in any suitable manner, but preferably from the top by means of a worm 17, which engages with a rack 18, formed on or secured to the upper edge of the receptacle 3.

The form of bag or sack which I propose to use in connection with my improved machine is preferably one in which the filling aperture is comparatively small, of just sufficient size to receive the filling-spouts 6 or 12, and is provided with means, such as an inwardly-extending neck or valvular fold, which when the filling-spout is withdrawn automatically close the filling-aperture of the bag, and thus make it feasible to permit the bag to drop directly from the filling-machine into a barrel or other shipping-receptacle without previous tying or sewing. Such bag forms the subject-matter of my application for United States Letters Patent, Serial No. 684,047, filed on the 15th day of July, 1898.

18 represents the bag or sack resting in a bag-holder composed of the inclined trough-shaped portion 19 and a hinged drop or trap 20, and 21 represents the inwardly-extending neck formed around the filling-aperture of the bag, which aperture is preferably formed in one corner, so that as the material runs into the bag it will fill uniformly up to such corner, and hence become entirely filled. The end of each of the filling-spouts 6 12 is provided with an automatic valve-cap, which when the bag is inserted over the end of the filling-spout automatically opens and permits the material to escape into the bag, and when the bag falls off this cap is pulled down over the end of the filling-spout and checks the flow. The form of valve-cap shown and which I prefer to use consists of a collar 22, sleeved over the lower end of the spout 6 or 12 and having its lower extremity provided with a number of spring tongues or lips 23, which are drawn together to a point, so as to completely close the end of the filling-spout when the tongues are unrestrained; but when the collar 22 is forced upwardly on the filling-spout the tongues are spread apart, as shown in Fig. 2, permitting of free exit. Before the bag is inserted over the filling-spout the valve-cap 22 23 is in the position shown in Fig. 3 and the attenuated tongues 23 then form a pointed projection to facilitate the insertion into the bag, and as the operator forces the bag upwardly over the valve cap the presses the edge of the bag under a spring friction-hold 24, secured to collar 22 by screw 25 and being of such a form that the bag may be forced in or pulled out when sufficient power is applied, the engaging point of the friction-hold being bent so as to be beveled on both sides, as shown. As the collar 22 rides upwardly on the filling-spout a rib or flange 26 thereon engages with a spring-catch 27, secured to the spout and thus prevents the accidental descent of the valve-cap should the friction of the tongues 23 be insufficient for this purpose. The inner end of the screw 25 runs in a slot 28 in the filling-spout, and thus limits the reciprocating movement of the valve-cap, as well as preventing its rotary movement and holding the friction-hold 24 in the proper position. When the predetermined weight of the material has run into the bag 18, the drop or trap 20 is automatically released and the bag being then unrestrained is of sufficient weight to pull the cap-valve away from the catch 27 and slide the same down the filling-spout until the screw 25 reaches the lower end of the slot 28, when the sudden arrest of the cap-valve causes the bag to jerk away from the friction-hold 24, whence it falls into a suitable receptacle or other desired place, the act of its descent having in the meanwhile closed the filling-spout. To the end that the bag may automatically drop off in this manner, the bag-holder 19 20 is supported upon a standard 29, whose upper end carries two perforated ears 30, to which the trough portion 19 of the bag-holder is rigidly secured. The hinged trap or drop 20 is secured to a tubular journal 31, arranged between the ears 30 and being pivoted on a bolt 32, passing through both the journal 31 and ears 30, as shown in Fig. 4, and arranged within the hollow or tubular journal 31 is a spiral spring 33, one end of which is secured to the fixed bolt 32 and the other end to the journal 31 in such manner as to cause the trap or drop 20 to remain normally in its elevated position. The edge of the journal 31 is provided with a notch 34, with which engages a dog or catch 35 when the drop 20 is in its normal or elevated position, the purpose of the catch 35 being to hold the trap against deflection under the weight of the bag, the spring 33 being merely sufficient to return the trap or drop 20 after the bag has passed over it. This standard 29 is supported upon one end of the scale-beam 36 by means of pivot 37, the lower end of the standard being pivoted by arm 38 to the main standard 39 of the scale. Arranged over the scale-beam is a weight or hammer 40, which when the scale tips or weighs down under the predetermined weight of the bag falls against the tail 41 of the dog or catch 35 and instantly releases it from the tooth 34, the dog being returned to its engaging position by a spring 42. This weight or hammer 40 is supported upon a stem 43, which is pivoted at 44 to the scale-beam; but it is limited in its oscillating movement by a stop-pin 45, engaging in a slot 46, formed in the stem 43. This pin 45 is so arranged with relation to the center of gravity of the weight or hammer 40 that as soon as the balance is attained the center of gravity of the weight will be between the stop 45 and the piece 41, and the weight will consequently fall against such piece 41 and release the trap or drop 20 without interfering with the accurate weighing of the scale. After the weight of the bag is relieved from the scale-beam the scale-weight will throw the hammer 40 back to its upright position, as indicated in Fig. 2. It will of course be understood that the filling funnel or spout does not support any part of the weight of the bag contents, but simply supports the loose corner of the bag in which it is inserted, and hence does not materially affect the accurate weighing of the apparatus. One of these scales or weighing devices is arranged under each one of the filling-spouts, and in order that the same apparatus may be used for various sizes of bags each weighing apparatus or scale is made adjustable vertically and longitudinally, so that the corner of the bag may always come directly under the filling-spout and enable such spout to support the corner in the manner shown in Fig. 2, and thereby better facilitate the filling of the bag. In order to accomplish this, I mount the standard 39 of each scale upon a horizontal arm 47, which in turn has a slide 48 adjustably secured to a vertical rib 49, formed on or fastened to the sides of the portion 16 and receptacle 11, the standard 39 being also adjustably mounted upon the arm 47. The arm 47 and the rib 49 may be provided with graduations, as shown, indicating bags of various pounds, so that should it be desired to fill a two-pound bag, for instance, the slide of the standard 39 would be slipped along the arm 47 until it registered with two pounds on the latter, and the slide 48 would be raised or lowered on the rib 49 until its edge also registered with two pounds on the rib 49. The weight of the scale-beam would then be placed at two pounds, whereupon all parts would be in position for filling a two-pound bag.

If desired, chutes 50 may be arranged to catch the bags as they fall from the bag-holders. It is of course impossible to determine with absolute accuracy just where the bag will drop off; but these chutes 50 may be located throughout that portion of the circle where the bags are liable to fall.

Having thus described my invention, what I claim as new therein, and desire to secure by Letters Patent, is—

1. A bag-filling machine having in combination a holder for the material, a spout leading downwardly therefrom, a sliding valve-cap located on the end of said spout for closing it and means for closing said cap by the removal of the bag, substantially as set forth.

2. A bag-filling machine having in combination a holder for the material, a spout leading downwardly therefrom, means for supporting the bag under the spout, and an automatically-closing valve-cap fitted on the end of the spout and adapted to be opened by the spout when forced upwardly thereon, substantially as set forth.

3. A bag-filling machine having in combination a holder for the material, a spout leading downwardly therefrom, a valve-cap composed of a collar fitted over said spout and having attenuated spring-tongues adapted to be forced open by the end of the spout, and a friction-hold on said valve-cap for gripping the edge of the bag, substantially as set forth.

4. A bag-filling machine having in combination a receptacle or holder for the material, a spout leading downwardly therefrom, a sliding cap on said spout having a clip or friction-hold for supporting the corner of the bag, a bag-support arranged under said spout and having a hinged trap and means for automatically releasing said trap when the bag has obtained the required weight of material, substantially as set forth.

5. A bag-filling machine having in combination the upper receptacle 3 provided with the annular bottom 5, the upper bank of filling-spouts 6 leading downwardly and outwardly from said bottom 5, the standard 1, the pipe or cylinder 8 secured around said standard, the inclined bottom 7, the receptacle 11 of smaller diameter than the receptacle 3, the filling-spouts 12 leading downwardly from the bottom of the receptacle 11, the stem 16 supported upon the standard 1, the fixed propellers 10, 14, means for revolving said receptacles 3 11, the chutes 4 15 leading into receptacle 3 and pipe 8 respectively, and means arranged under each of the filling-spouts 6 12 for supporting the bag, substantially as set forth.

A. M. BATES.

Witnesses:
F. A. HOPKINS,
EDNA B. JOHNSON.